June 3, 1969

H. L. KIFF 3,447,601

FILTERING DEVICE

Filed Dec. 12, 1966

INVENTOR.
HARVEY L. KIFF
BY M. A. Hobbs
ATTORNEY

United States Patent Office 3,447,601
Patented June 3, 1969

3,447,601
FILTERING DEVICE
Harvey L. Kiff, 704 Lakeside St.,
La Porte, Ind. 46350
Filed Dec. 12, 1966, Ser. No. 601,164
Int. Cl. F28f 19/00
U.S. Cl. 165—119      7 Claims

ABSTRACT OF THE DISCLOSURE

A filtering device for an engine radiator in which the lower portion of the filtering device consists of an imperforate cup-shaped part containing a filter element and the upper portion contains holes through which the coolant circulates. The device is suspended in the upper part of the radiator near the liquid level.

---

The cooling systems of internal combustion engines often contain sludge, iron rust or other foreign matter which is either constantly circulated through the system or which tends to float on the water in the system, rising to the water level in the radiator where it retards the flow of water and restricts the passage of water into the radiator tubes. Various types of full flow filters could perform part of the filtering operations satisfactorily, but these types have the inherent disadvantage of seriously restricting the coolant flow when they become dirty and clogged, thereby rendering the cooling system inoperable or ineffective and resulting in damage to the engine. Further, these types will not effectively remove floating foreign material which tends to restrict the radiator. In order to maintain the full flow filter in operation and in a safe condition, periodic service and cleaning are required, but often are not done as the automobile becomes old or is used extensively. Other types of filtering devices have been used or tried in the cooling systems of internal combustion engines, but these are either ineffective or may interfere with the effective operation of the system when they become dirty. It is therefore one of the principal objects of the present invention to provide a filtering device for the cooling system of internal combustion engines, which can easily be installed in the radiator of the system and completely and readily removed therefrom for the purpose of thoroughly cleaning the device, and which will operate effectively over long periods of time without servicing or other attention.

Another object of the invention is to provide a relatively simple filtering device for an internal combustion engine, which does not interfere with the normal operation of the cooling system, regardless of whether the device is clean or dirty, and which is so constructed and installed that it can easily be inspected from time to time to determine the condition of the filter.

Still another object is to provide a filtering device of the aforesaid type which removes both the suspended and floating particles and sludge from the water in the cooling system, and collects the material over a period of time, and will continue to operate and permit the system to operate effectively whether or not the filter is serviced and maintained in optimum operating condition.

Further objects and advantages of the invention will become apparent from the following description and accompanying drawings, wherein.

Figure 2:
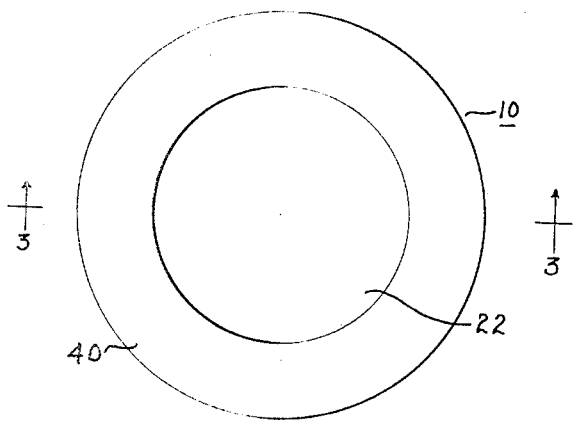
FIGURE 2 is a top view of the filtering device.
Figure 4:
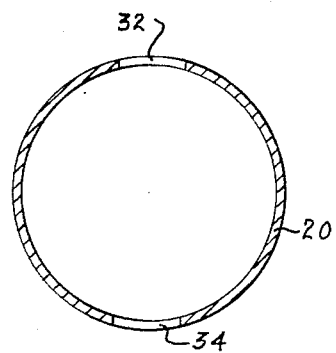
FIGURE 4 is a horizontal cross-sectional view taken on line 4—4 of FIGURE 1.
Figure 1:
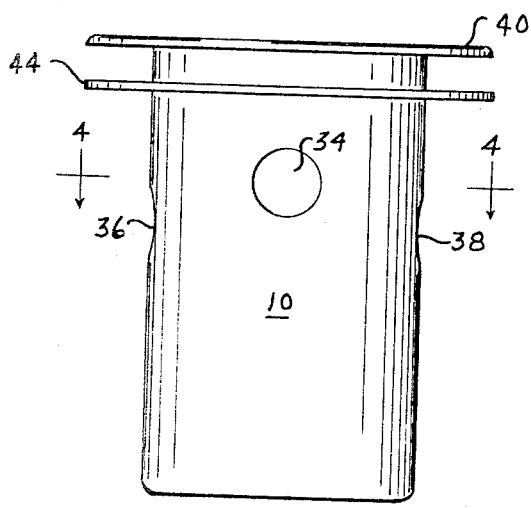
FIGURE 1 is an elevational view of the present filtering device.
Figure 3:
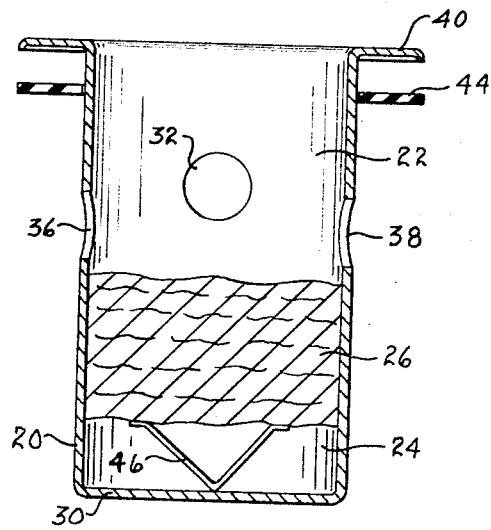
FIGURE 3 is a vertical cross-sectional view of the filtering device, the second being taken on line 3—3 of FIGURE 2.

Referring more specifically to the drawings, numeral 10 designates generally the present filtering device, 12 a portion of a conventional automobile radiator having a spout 14, tubes 16, and upper liquid coolant chamber 18 through which the coolant circulates. Spout 14 is provided was a cap (not shown) and may be provided with an overflow passage and/or a pressure release valve. The details of the radiator are well known and the present filtering device is adapted to be installed in and used with most standard automobile, truck and bus radiators and with industrial engines having radiators similar to those used in the automotive field.

The present filtering device consists of cylindrical side walls forming a body indicated generally by numeral 20 defining an upper cylindrically shaped fluid chamber 22 and a lower cylindrically shaped chamber 24 for receiving foreign matter. An element 26 is disposed in the lower chamber dividing it into an upper portion and a lower portion, the lower portion receiving the foreign matter and other sediment. An imperforate bottom 30 is connected integrally with the side walls to form an enclosed chamber 24 with the exception of the open top communicating with chamber 22. The cylindrical side walls and bottom are preferably formed of brass, copper or aluminum, or other suitable material which will withstand the temperature of the water in the radiator over extended periods of time. Some plastic materials may be used satisfactorily. The walls of upper chamber 22 are provided with a plurality of holes 32, 34, 36 and 38. In the embodiment shown in the drawings, holes 32 and 34 spaced opposite to one another are on a level above holes 36 and 38, likewise spaced opposite to one another. These holes permit the water to circulate through chamber 22, and for effective operation of the filtering device, the water level in the upper portion of the radiator should intersect one or the other set of holes so that the material floating on the water surface can readily pass into chamber 22; however, splashing or sloshing of the water will permit operation of the device even when the water in the radiator is below the holes. A pair of horizontally positioned slots may be used in place of the holes shown.

Figure 5:
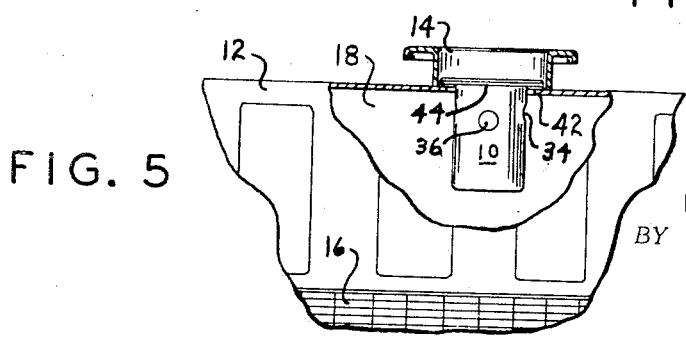
FIGURE 5 is a fragmentary cross-sectional view of an automobile radiator including the spout, showing the present filtering device in elevation, installed in the radiator in operating position.

The body is provided with a radially extending annular flange 40 joined integrally to the upper edge of body 20 and adapted to support the body in the radiator fluid chamber above tubes 16 in the manner illustrated in FIGURE 5, the flange 40 seating on an internal flange 42 at the bottom of the radiator spout 14. An annular gasket 44 of rubber or rubber-like material is preferably inserted between flange 40 and flange 42; however, the device is not normally held rigidly in place but rather is retained in place by its own weight in the position shown. The device may be formed as a part of the radiator spout or neck.

Filter element 26 consists of a body of fibrous material preferably in a compact condition, formed into a generally cylindrical shape of substantially the same diameter as the internal diameter of chambers 22 and 24. The fibrous material may be made of any suitable substance, such as cotton waste, plastic fibers or other porous material which permits fluid to flow completely therethrough. The filter element is inserted in chamber 24 and is preferably suspended therein so that a space is provided between the bottom of the element and bottom 30 of the filtering device. The size of the element may be such that its contact with the internal side walls of section 24 will hold it in the desired suspended position. However, a wire clip 46 or other member may be used to support the element in spaced relation to bottom 30. Any other suitable spacing means may be used if desired, or the element may be seated directly on the bottom such that the perforations and passages in the element form the chamber for collecting the sediment and other foreign material removed from the coolant by the present filtering device.

In the use of the present filtering device, it is inserted in the radiator with flange 40 supported at the bottom of the spout on internal flange 42 or on another suitable supporting means in the upper portion of chamber 18 of the radiator, body 20 being submerged in the coolant with the level thereof intersecting holes 32, 34 or 36, 38. The radiator coolant circulates through chamber 22 and the material in suspension in the coolant and floating thereon passes through holes 32, 34, 36 and 38. When the coolant is passing through chamber 22, it becomes relatively calm, thus permitting the suspended material to settle into filter element 26 and to gradually settle therethrough into the space beneath the element. Likewise, the material floating on the coolant tends to settle in the chamber, passing downwardly into the filter element where it is entrapped and prevented from returning to the coolant in the raditor. The device does not interfere with the normal operation of the radiator nor with the proper servicing of the car, including checking of the coolant in the radiator. If the water in chamber 18 of the radiator is too low to pass into holes 32, 34, 36 and 38, the radiator is not properly filled. For effective operation of the filter, the water level must be above the lower edge of the lower set of holes 36 and 38. If additional water is required, it can be added without removing the filter; however, this may result in flushing part of the sediment from the filter element in chamber 24 back into the radiator. Therefore, it is normally advisable to remove the filtering device from the radiator spout when the radiator is to be filled.

When the device is to be serviced and cleaned it is lifted from the spout, and filter element 26 is removed from body 20. The element can then be submerged in gasoline or other cleaning fluid to remove the sediment from the pores thereof, and body 20 can be flushed with water or any other suitable cleaning solution. The element is then inserted in place in body 20 and the device returned to its operating position in the radiator as illustrated in FIGURE 5. For most effective operation of the filtering device, filter element 26 should be replaced from time to time, since the pores of the element may become partially and permanently clogged, thus reducing the effectiveness of the element in collecting the sediment and floating material passing thereinto.

While only one embodiment of the present invention has been described in detail herein, various changes and modifications may be made without departing from the scope of the invention.

I claim:

1. A filtering device for an internal combustion engine having a radiator with a coolant filling inlet opening near the top, said device comprising walls forming a cylindrical body having an upper chamber and a lower chamber with imperforate side walls, said upper chamber having a plurality of fluid flow holes therein spaced around the body for horizontal circulation of the coolant through said upper chamber, and an imperforate bottom member joined to the lower end of said body walls and forming with said walls said lower chamber for receiving foreign matter removed from coolant, a filtering element disposed in said body below said holes and extending across said lower chamber, and means on said body for suspending said device in the coolant in the radiator with the holes in said body at least partially submerged below the surface of the coolant sufficiently to permit the coolant to circulate through the upper chamber above said filtering material.

2. A filtering device as defined in claim 1, in which the side walls of the upper chamber contain a first set of oppositely disposed holes, and a second set of oppositely disposed holes positioned 90° with respect to said first holes and on an axis below the axis of said first set of opposed holes.

3. A filtering device as defined in claim 1 in which said filter element consists of a porous material through which the coolant can circulate and through which the foreign matter can pass, and in which said element is suspended in said lower chamber in spaced relation to said bottom.

4. A filtering device as defined in claim 2 wherein said filter element consists of a porous material through which the coolant can circulate and through which the foreign matter can pass, and wherein said element is suspended in said lower chamber in spaced relation to said bottom.

5. A filtering device for an internal combustion engine as defiend in claim 1 in which said upper and lower chambers are connected continuously with one another, and said upper chamber is open at the top thereof.

6. A filtering device for an internal combustion engine as defined in claim 4 in which said upper and lower chambers are connected continuously with one another, and said upper chamber is open at the top thereof.

7. A filtering device as defined in claim 6 in which said filtering element is positioned fully below the lowest portion of any of said holes.

References Cited

UNITED STATES PATENTS

| 1,436,294 | 11/1922 | Scott | 210—473 |
| 2,082,866 | 6/1937 | Alexander | 165—119 X |
| 2,596,589 | 5/1952 | Musbaum | 165—119 X |
| 1,217,732 | 2/1917 | Fedders | 165—119 X |

ROBERT A. O'LEARY, *Primary Examiner.*

T. W. STREULE, *Assistant Examiner.*

U.S. Cl. X.R.

165—71; 210—167, 174